US006335610B1

(12) United States Patent
Winstead

(10) Patent No.: US 6,335,610 B1
(45) Date of Patent: Jan. 1, 2002

(54) METHOD AND APPARATUS FOR DETERMINING THE OPERATIONAL ENERGY COST OF A HYBRID VEHICLE

(75) Inventor: Vincent John Winstead, Madison, WI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/607,698

(22) Filed: Jun. 30, 2000

(51) Int. Cl.[7] .............................................. H01M 10/46

(52) U.S. Cl. ...................................................... 320/132

(58) Field of Search ................................. 320/104, 132, 320/149; 429/90, 61; 324/427, 433

(56) References Cited

U.S. PATENT DOCUMENTS

| 5,416,712 A | | 5/1995 | Ibaraki et al. |
| 5,525,890 A | * | 6/1996 | Iwatsu et al. |
| 5,820,172 A | | 10/1998 | Brigham et al. ........................ |

* cited by examiner

*Primary Examiner*—E Tso
(74) *Attorney, Agent, or Firm*—Ford Global Tech., Inc

(57) ABSTRACT

A method and apparatus 46 for dynamically and periodically determining the amount of energy expended by a hybrid vehicle 10. Particularly, apparatus or controller 46 dynamically computes the amount of utilized energy based upon the initial charge resident within the battery 14, the amount of power supplied to the battery 14 and the discharge efficiency of the battery 14, thereby allowing an overall energy management strategy to be implemented and allowing an accurate operational analysis and/or simulation to be conducted.

15 Claims, 1 Drawing Sheet

METHOD AND APPARATUS FOR DETERMINING THE OPERATIONAL ENERGY COST OF A HYBRID VEHICLE

FIELD OF THE INVENTION

The present invention generally relates to a method and an apparatus for determining the operational energy cost of a hybrid vehicle and more particularly, to a method and an apparatus for determining the amount of energy expended by a hybrid vehicle, effective to evaluate various vehicle designs and operational strategies and to allow relatively accurate operational simulation studies to be conducted.

BACKGROUND OF THE INVENTION

A hybrid vehicle includes at least two sources of torque type energy which are alternatively used to power or operate the vehicle (i.e. the respectively generated torque energy is communicated to the wheels of the vehicle, effective to allow the hybrid vehicle to be selectively operated). Typically, a first source of energy comprises an internal combustion engine which utilizes hydrocarbon type fuel to provide the desired power. A second source of energy usually comprises an electric battery in combination with a motor. The battery is selectively and periodically "recharged" by the operating internal combustion engine in order to ensure the continued availability of the second energy source. The electric battery therefore desirably allows the use of the hydrocarbon fuel to be reduced and allows for a desired reduction in the various undesirable by-products produced by the use of such fuel.

It is relatively difficult to determine the cost or the amount of energy utilized by such a hybrid vehicle due to the use of multiple energy sources and due to the use of at least one of the energy sources to provide power or electrical energy to the other, thereby preventing or substantially hindering the creation of a relatively accurate energy consumption or energy cost model, preventing or substantially hindering the creation of a relatively accurate operational simulation of such a hybrid vehicle, and preventing or substantially hindering the ability to accurately assess various design configurations and operational strategies. While some techniques do attempt to determine such energy cost or consumption, they are not accurate and do not reliably estimate or determine such costs.

There is therefore a need for a method and an apparatus for determining the operational energy cost for a hybrid vehicle in a manner which overcomes at least some of the previously delineated drawbacks of prior techniques.

SUMMARY OF THE INVENTION

It is a first object of the present invention to provide a method and an apparatus for determining the operational energy cost of a hybrid vehicle in a manner which overcomes at least some of the previously delineated drawbacks.

It is a second object of the present invention to provide a method and an apparatus for determining the operational energy cost of a hybrid vehicle in a manner which overcomes at least some of the previously delineated drawbacks and which utilizes the state of charge or an initial charge placed within the battery.

According to a first aspect of the present invention, an apparatus for determining the operational energy cost for a hybrid vehicle is provided. The apparatus comprises a controller which dynamically computes an equivalent battery energy cost and which uses the dynamically computed cost to determine the operational energy cost for a hybrid vehicle.

According to a second aspect of the present invention, a method is provided for determining the operational cost of a hybrid vehicle. The method includes the steps of computing a discharge efficiency; computing a recharge efficiency; computing an amount of energy supplied from regenerative braking, and using said computed charge efficiency, recharge efficiency, and said amount of energy to determine the operational cost of said vehicle.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
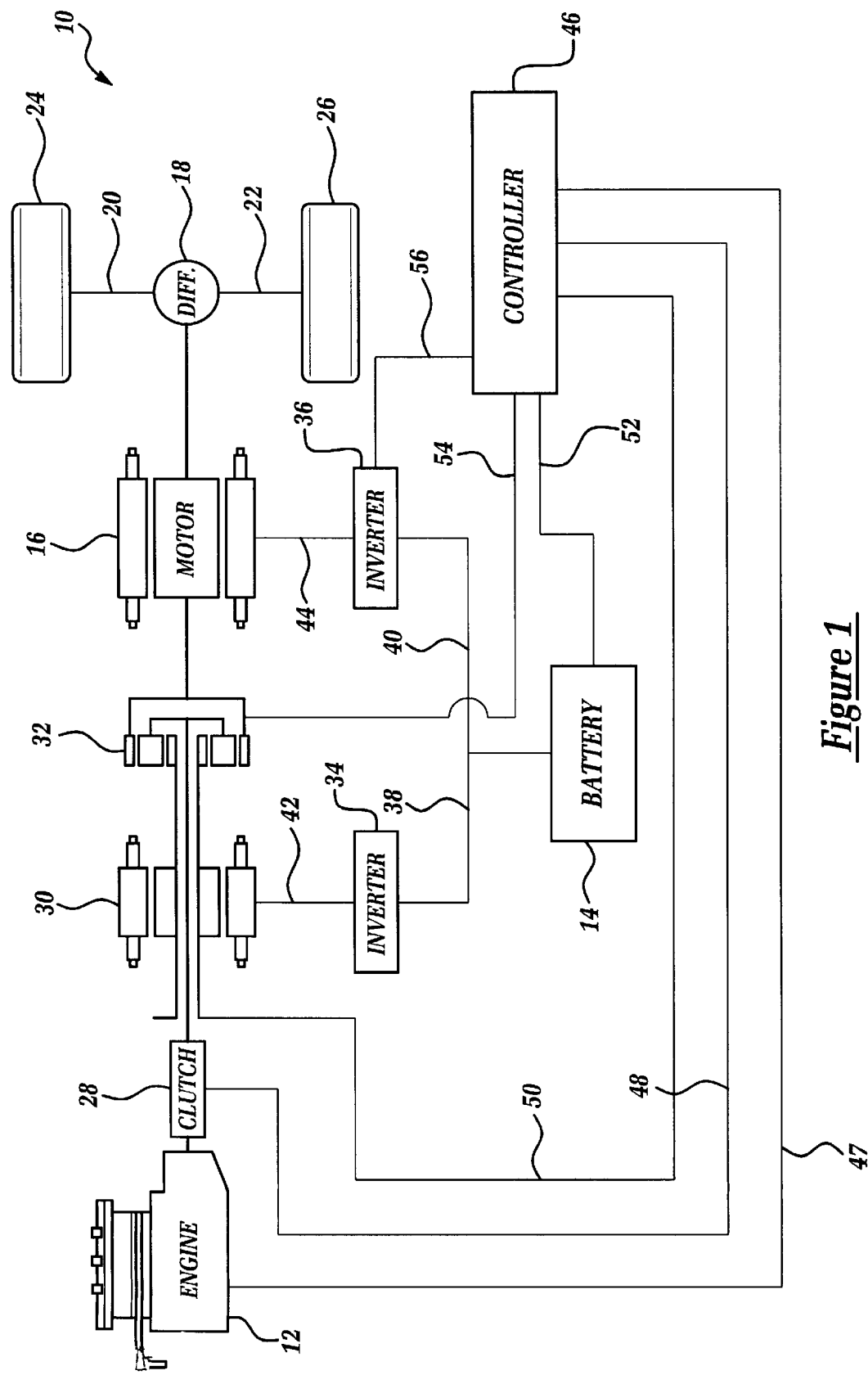
FIG. 1 is a partial side view of a hybrid vehicle which is made in accordance with the teachings of the preferred embodiment of the invention

Referring now to FIG. 1, there is shown a hybrid vehicle 10 which is made in accordance with the teachings of the preferred embodiment of the invention. As shown, vehicle 10 includes a first source of torque energy (i.e., in one non-limiting embodiment an internal combustion engine) 12, an electrical battery 14, and a motor 16. In one non-limiting embodiment of the invention, the battery 14 and the motor 16 cooperatively comprise a second source of torque energy.

Hybrid vehicle 10 further includes a differential assembly 18 which is movably coupled to a pair of axles 20, 22, and a pair of substantially identical wheels 24, 26. As shown, wheel 24 is movably coupled to the axle 20 while wheel 26 is movable coupled to the axle 22. Further, hybrid vehicle 10 includes a clutch 28, a generator 30, and a planetary gear assembly 32.

As shown, the clutch 28 is coupled to the first source of torque energy 12 (i.e., to the selectively movable output shaft of the internal combustion engine 12), and to the generator 30. The generator 30 is coupled to the planetary gear assembly 32 and the planetary gear assembly 32 is further coupled to the motor 16. The selectively rotable output shaft of the motor 16 is coupled to the differential assembly 18.

Hybrid vehicle 10 further includes a pair of substantially identical electrical power inverters 34, 36 which are respectively, electrically, and physically coupled to the battery 14 by busses 38, 40. Inverters 34, 36 are further respectively, electrically, and physically coupled to the generator 30 and to the motor 16 by use of busses 42, 44.

Further, hybrid vehicle 10 includes a controller 46 which is operable under stored program control and which is electrically, communicatively, and physically coupled to the engine 12, clutch 28, generator 30, battery 14, planetary gear assembly 32, and inverter 36 by respective busses 47, 48, 50, 52, 54, and 56. The controller 46 periodically monitors the state of charge resident within the battery 14 and stores a certain state of charge threshold value. Controller 46, by use of clutch 28, gear assembly 32, and generator 30 allows motor 16 to operatively receive electrical power from the battery 14 and generate and provide torque to the differential 18 and to wheels 24, 26, and alternatively cause the engine 12 to operate and generate torque which is transferred to the differential 18. Moreover, in this manner and when the measured/monitored state of charge falls below the stored threshold value, controller 46 typically causes the internal combustion engine 12 to operate and provide electrical charge to the battery assembly 14 though and/or by use of the inverter 34. Regenerative charge may be supplied by the motor 16 through inverter 36. It should be realized that while a certain type or configuration of a hybrid vehicle is shown in FIG. 1, the foregoing invention may be operatively applied to a wide variety of dissimilar hybrid vehicle configurations and that vehicle 10 may selectively employ additional sources of energy. The methodology of the preferred embodiment of the invention is described in detail below.

First, it should be realized that one may represent a power threshold (i.e., a metric which is related to the state of charge of the battery 14 and which is typically used in the analysis and/or operational simulation of a hybrid vehicle) in the following manner:

$$P_{theshhold} = P(\eta_{engine}, \eta_{overall\ motor}) \quad (Eq.\ 1)$$

where the efficiency of the engine 12, denoted as "$\eta_{engine}$", is a known function of certain brake specific fuel consumption data or a "data map" which is typically denoted as "BSFC" (i.e. $\eta_{engine}(BSFC(T_{engine}, \omega_{engine}))$) and the overall efficiency of the motor 16, denoted as "$\omega_{motor\ overall}$", is a function of a combination of battery efficiency, motor efficiency and the efficiency of the component (i.e., typically the combustion engine 12 in the hybrid electric vehicle 10) generating the energy which is stored in the battery 14, (i.e., $\omega_{motor\ overall}(\omega_{battery\ discharge}, \eta_{motor}, \eta_{engine\ during\ battery\ charge} * \eta_{battery\ during\ battery\ charge})$). As used in this application, the symbol "$\eta$" denotes efficiency of the component or assembly or the activity (e.g. battery charging) which is identified as the subscript of the symbol, where the symbol "$T_{engine}$" denotes the torque produced by the engine 12, and where the symbol "$\omega_{engine}$" denotes the angular speed of the engine 12.

If one considers the energy cost representation to be substantially equivalent to the efficiency representation, the following Equations may be developed:

$$\eta_{engine} = BSFC(T_{engine}, \omega_{engine}) \quad (Eq.\ 2)$$

$$\eta_{motor\ overall} = (BSFC_{battery\ charge} * \eta_{battery\ charge})/(\eta_{battery\ discharge} * \eta_{motor}(T_{motor}, \omega_{motor})) \quad (Eq.\ 3)$$

where the term "$T_{motor}$" denotes the torque supplied by the motor 16 and where the term "$\omega_{motor}$" denotes the angular speed of the motor 16.

or $$\eta_{motor\ overall} = CBE/(\eta_{battery\ discharge} * \eta_{motor}(T_{motor}, \omega_{motor}) \quad (Eq.\ 4)$$

where the term "CBE" denotes an equivalent battery energy cost which, according to the teachings of the preferred embodiment of the invention, is dynamically and periodically computed by the controller 46.

Assuming that the battery efficiency is a function of the amount of power drawn from or delivered to the battery 14, the threshold power may be represented as follows:

$$P_{threshold} = P\{BSFC = CBE/(\eta_{battery\ discharge}(P_{motor}) * \eta_{motor})\} \quad (Eq.\ 5)$$

$$BSFC = CBE/(\eta_{battery\ discharge}(P_{motor}) * \eta_{motor}) \quad (Eq.\ 6)$$

where the term "$P_{motor}$" denotes the amount of power supplied by the motor 16.

The above equations therefore provide a useful representation for the power threshold of a hybrid vehicle and allow for the dynamic computation of the value of the term which has been denoted as "CBE". The term "dynamic", as used in this application, means that a calculation of "CBE" may be achieved at periodic intervals of time, by controller 46, and is effective to "capture" or dynamically account for the energy which is communicated to the battery 14 from recharging and brake regeneration activities or events, as well as the energy which has been expended from the battery 14 and/or by the vehicle 10.

Further, it should be realized that the recharging events could generate different fuel consumption or energy cost values for the variable which is denoted as "$BSFC_{battery\ charge}$" (i.e. a measure of the energy cost due to the recharging the battery 14) depending upon the current mode of operation of the engine 12. Moreover, the regenerative braking may have a different and uniquely associated energy cost depending upon the mode of operation of the engine 12 (i.e., depending upon whether the engine is providing traction power to the vehicle). Hence, in the preferred embodiment of the invention, the regenerative brake energy is assigned a predetermined constant cost value which is denoted as "$C_R$" and which may represent an overall average or representative cost of supplying the regenerative energy by use of most or some of the various operational modes of engine 12. Further, a second pre-determined cost variable, denoted as "$C_{recharge}$", is used to measure or evaluate the cost of or efficiency of recharging the battery 14 by the engine 12 in a certain operational mode. The variable "$C_{recharge}$" is therefore a function of the operational mode of the engine.

In the preferred embodiment of the invention, there are four components to the battery energy cost which, are periodically calculated by controller 46 and used by controller 46 to cooperatively and dynamically create a "running average". The first of these components is as follows:

$$CBE_1 = C^i_{recharge}(EngineBFSC) * \int_{t^i engine\ on}^{t^i engine\ off} P_{engine}(t)\, dt \quad (Eq.\ 7)$$

Where $C^i_{recharge}$ = the "cost" of supplying recharging type charge energy to the battery 14 or the amount of such supplied energy since the last computation was completed. The second of these components is as follows:

$$CBE_2 = \quad (Eq.\ 8)$$

$$C_R * \int_{t^i recharge\ on}^{t^i recharge\ off} \{(P_{required}(t) - P_{losses}(t)) : P_{required}(t) < 0\}\, dt$$

Where the term "$C_r$" = the cost of supplying regenerative type charging energy to the battery 14 or the amount of such supplied energy since the computation was completed. The third of these components is as follows:

$$CBE_3 = C_{discharge} * \int_{t^i motor\ on}^{t^i motor\ off} P_{motor}(t) \quad (Eq.\ 9)$$

Where the term $C_{discharge}$ equals the discharge efficiency of the battery 14. The fourth of these components is as follows:

$$CBE_4 = C_{initial\ charge} * (\text{Intitial Energy Quantity in the Battery}) \quad (Eq.\ 10)$$

Assuming that all of the initial battery energy emanates from an energy source whose cost is known, such as the engine 12 operating in a "idle" mode and having a known and associated "BSFC" value, the following equations may be developed:

$$C_{initial\ charge} = BFSC_{engine} \qquad (Eq.\ 11)$$

$$T_i = \sum_i \left( \int_{t^i engine\ on}^{t^i engine\ off} P_{engine}(t)\,dt \right) \qquad (Eq.\ 12)$$

$$T_2 = \sum_i \left( \int_{t^i recharge\ on}^{t^i recharge\ off} \{(P_{required}(t) - P_{losses}(t)) : P_{required}(t) < 0\}\,dt \right) \qquad (Eq.\ 13)$$

$$T_3 = \sum_i \left( \int_{t^i motor\ on}^{t^i motor\ off} P_{motor}(t)\,dt \right) \qquad (Eq.\ 14)$$

$$T_4 = (\text{Initial Energy Quantity in the Battery}) \qquad (Eq.\ 15)$$

Where the term "P" denotes the amount of power required by the hybrid vehicle 10, the term "$P_{losses}$" denotes the amount of the supplied power which is lost, and the term "$P_{motor}$" denotes the power supplied by the motor.

Hence, in the preferred embodiment of the invention, the cost of battery energy may be denoted and dynamically calculated as follows:

$$CBE = (CBE_1 + CBE_2 + CBE_3 + CBE_4)/(T_1 + T_2 + T_3 + T_4) \qquad (Eq.\ 16)$$

This cost of battery energy can therefore be dynamically updated as power flow changes in the hybrid vehicle 10 and/or in the battery 14. Moreover, this technique readily lends itself to discretization and discrete type simulation and to dynamic power thresholding computation which could potentially enhance fuel economy and reduce engine emissions (e.g. by allowing for a more accurate computation of the amount of charge resident within the battery 14). Further, using this technique with a variable (positive or negative) initial battery charge cost allows one to create and dynamically modify an overall hybrid vehicle energy management strategy and allows one to accurately measure and/or simulate the foregoing energy flow as well as other energy flows occurring within the hybrid vehicle 10, thereby enabling the creation of an overall energy simulation.

It should be appreciated that the invention is not limited to the exact method which has been previously delineated above, but that various changes and modifications may be made without departing from the spirit of the scope of the inventions as are more fully set forth in the following claims.

What is claimed is:

1. An apparatus for use in a hybrid vehicle of the type having a internal combustion engine which generates power and has a certain recharge efficiency and a battery having a certain discharge efficiency and a certain initial charge, said apparatus comprising:
   a controller which dynamically determines the energy expended by said hybrid vehicle by creating an equivalent battery energy cost which is computed by use of said certain discharge efficiency, by use of said certain initial charge, and by use of said certain recharge efficiency.

2. The apparatus of claim 1 wherein said hybrid vehicle causes energy that is produced by regenerative braking to be selectively communicated to said battery and wherein said equivalent battery cost is computed by use of said energy.

3. An apparatus for use in a hybrid vehicle of the type having an internal combustion engine which generates a certain first amount of power, a motor which generates a certain second amount of power, and a battery having a amount of initial charge, said apparatus comprising:
   a controller which determines the energy used by said hybrid vehicle by creating a first quantity by multiplying said first amount of generated power by a certain attribute of said internal combustion engine, by creating a second value by use of a constant value; by creating a third quantity by multiplying a battery discharge efficiency by said second certain amount of power, and by adding said first, second, and third quantities to said initial charge, thereby creating a fifth quantity which may be used to approximate said amount of energy used by said hybrid vehicle.

4. The apparatus of claim 3 wherein said certain attribute of said internal combustion engine comprises a recharge efficiency.

5. The apparatus of claim 4 wherein said constant value is based upon an amount of regenerative power supplied to said battery.

6. The apparatus of claim 5 wherein said third amount of energy is based upon a certain amount of required power.

7. The apparatus of claim 6 wherein said controller further divides said fifth quantity by a certain amount which is based upon the amount of energy which is present within said battery.

8. A method for determining the amount of energy utilized by a hybrid vehicle, said method comprising the steps of:
   dynamically creating an equivalent battery energy cost as said vehicle is being operated, by use of a certain recharge efficiency and by use of an amount of regenerative power.

9. The method of claim 8 when said dynamically created equivalent battery energy cost is created by use of a certain discharge efficiency.

10. The method of claim 9 when said dynamically created battery energy cost is created by use of an initial battery charge.

11. The method of claim 10 wherein said dynamically created equivalent battery charge cost is created by use of a certain amount of required power.

12. The method of claim 11 wherein said dynamically created equivalent battery energy cost is created by creating a running average.

13. The method of claim 12 wherein said dynamically created equivalent battery energy cost is used to simulate the operation of said hybrid vehicle.

14. The method of claim 8 wherein said amount of regenerative power is calculated by use of a constant value.

15. The method of claim 13 wherein said amount of regenerative power is calculated by use of a required amount of power.

* * * * *